United States Patent [19]

Kelleher et al.

[11] Patent Number: 5,218,678
[45] Date of Patent: Jun. 8, 1993

[54] SYSTEM AND METHOD FOR ATOMIC ACCESS TO AN INPUT/OUTPUT DEVICE WITH DIRECT MEMORY ACCESS

[75] Inventors: Brian M. Kelleher, Palo Alto; Shu-Shia Chow, Los Altos, both of Calif.

[73] Assignee: Digital Equipment Corporation, Maynard, Mass.

[21] Appl. No.: 440,588

[22] Filed: Nov. 17, 1989

[51] Int. Cl.⁵ .......................................... G06F 13/00
[52] U.S. Cl. .................................. 395/275; 364/239.7; 364/243.5; 364/DIG. 1; 364/926.6; 364/939.3; 364/DIG. 2
[58] Field of Search ............... 364/200, 900, DIG. 1, 364/DIG. 2, 239.7, 243.5, 926.6, 939.3; 395/275, 250

[56] References Cited

U.S. PATENT DOCUMENTS

| | | |
|---|---|---|
| 4,402,046 | 8/1983 | Cox et al. .............................. 364/200 |
| 4,449,182 | 5/1984 | Rubinson et al. ..................... 364/200 |
| 4,491,916 | 1/1985 | Vallhonrat ........................... 364/200 |
| 4,604,694 | 8/1986 | Hough ................................. 364/200 |
| 4,689,739 | 8/1987 | Federico et al. ..................... 364/200 |
| 4,719,621 | 1/1988 | May ...................................... 370/85 |
| 4,777,595 | 10/1988 | Strecker et al. ................. 364/200 X |
| 4,799,148 | 1/1989 | Nishioka ............................. 364/200 |
| 4,814,977 | 3/1989 | Buonomo et al. .................... 364/200 |
| 4,847,754 | 7/1989 | Obermarck et al. ................. 364/200 |
| 4,953,101 | 8/1990 | Kelleher et al. .................... 364/900 |
| 5,014,186 | 5/1991 | Chisholm ............................ 395/275 |

FOREIGN PATENT DOCUMENTS 0330425 8/1989 European Pat. Off. .
0381325 8/1990 European Pat. Off. .

*Primary Examiner*—Michael R. Fleming
*Assistant Examiner*—Glenn A. Auve
*Attorney, Agent, or Firm*—Flehr, Hohbach, Test, Albritton & Herbert

[57] ABSTRACT

A system (30) for atomic access to an I/O device with DMA includes a CPU (32) connected to a floating point processor (FPU) (34) by bus (36). The CPU (32) is connected by a system bus (38) to a random access memory (RAM) (40), a cache (42) and an interface (44) in graphics subsystem (45). The interface (44) is connected by bus (46) to graphics processor (48). In this system, graphics subsystem (45) is an I/O device, and atomic access to it is required. Command packet interface (44) to the graphics subsystem (45) transfers geometry and graphics context information from main memory (40) to the graphics subsystem (45). For such transfers, an application writes a list of commands to a physically contiguous locked-down memory buffer (47) in its own address space. Since the system (30) has DMA, the buffer (47) resides in the main memory system (40). When the buffer (47) is full, the CPU (32) tells the graphics subsystem (45), via a read from an I/O address on the graphics subsystem (45), that it should begin a transfer of the command packet. Status of the operation is returned as a result of the I/O read transaction. After initiating the command packet transfer, the graphics subsystem (45) parses the packet and executes the appropriate operations atomically.

14 Claims, 3 Drawing Sheets

SYSTEM AND METHOD FOR ATOMIC ACCESS TO AN INPUT/OUTPUT DEVICE WITH DIRECT MEMORY ACCESS

BACKGROUND OF THE INVENTION

1. Field of the Invention

The present invention relates generally to a system and method for data transfer to a direct memory access (DMA) input/output (I/O) device which allows a client to access atomically the I/O device. Accessing atomically means that an instruction consisting of more than one individual operation is carried out completely, without interruption for any other operation. More particularly, it relates to such a system and method in a multiprocessor system where multiple processors concurrently access a single I/O device.

An I/O device typically receives data and instructions from the system's main computing resources in one of two ways: either through direct memory-mapped access of I/O registers, or through a DMA mechanism by which the I/O device transfers data directly to and from the main memory subsystem. In either scheme, if the size of the data transfer is larger than an atomic access on the system bus, there are multiple concurrent clients of the I/O device, and the I/O device has a single input stream, there must be a mechanism to synchronize the I/O device among the several clients.

2. Description of the Prior Art

Mutual exclusion of I/O devices, or other shared resources, is typically achieved through software interlocks. Some processor instruction sets contain interlocked instructions, which allow a processor of an I/O device client to perform multiple logical instructions as a single atomic instruction. For example, a processor may test a bit in memory, branch if it is clear, and then set the bit, all within a single instruction. This allows mutual exclusion on shared resources to be implemented through software locks. The I/O device or other shared resource is considered "locked" or unavailable if the bit is set. The process that set the bit "owns" the resource. Systems without interlocked instructions must go through some other atomic protocol, perhaps synchronizing through the operating system or some other unique process.

In particular, graphic subsystems in a multiclient, multiprocessor environment have states maintained internally that are set up in a previous operation and stay for a subsequent operation by the same processor. With interruption by another processor, there is no assurance that those states have been maintained. A technique for executing atomic instructions in this environment is therefore required.

SUMMARY OF THE INVENTION

A system for atomic access to an I/O device with direct memory access in accordance with this invention has at least one host data processor. A memory is connected to the at least one host data processor by a bus. A graphics subsystem comprising the input/output device is connected to the bus. The memory has a locked-down buffer, i.e., a buffer with a set lock bit, for storing a command packet including a plurality of instructions for the graphics subsystem. The at least one host data processor includes a first program for generating the command packet. The graphics subsystem includes a graphics processor addressable by the at least one host data processor under control of the first program to determine availability of the graphics processor. The graphics processor includes a second program for initiating transfer of the command packet to the graphics subsystem as an input/output read transaction when the graphics processor is available. The second program executes the plurality of instructions atomically.

A method for atomic access to an I/O device with direct memory access in accordance with this invention includes generating a command packet including a plurality of instructions for the input/output device. The command packet is stored in a memory having a physically contiguous locked-down memory buffer. The input/output device is interrogated to determine availability of the input/output device. A transfer of the command packet to the input/output device as an input/output read transaction is initiated when the input/output device is available. The plurality of instructions is executed atomically.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
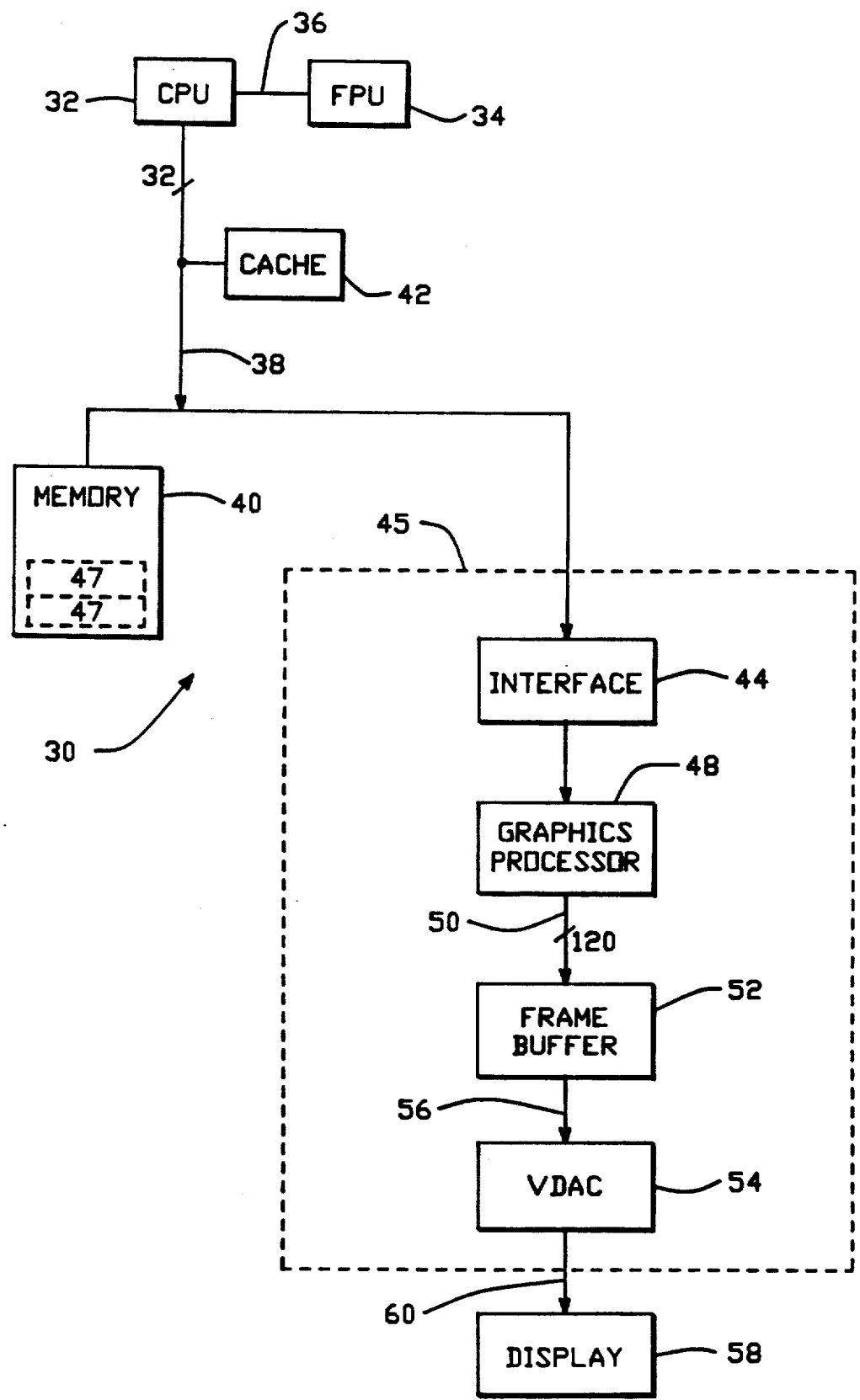
FIG. 1 is a block diagram of a system in accordance with the invention.

Turning now to the drawings, more particularly to FIG. 1, a block diagram of a system 30 for atomic access to an I/O device with DMA is shown. A CPU 32 is connected to a floating point processor (FPU) 34 by bus 36. The CPU 32 is connected by a 32-bit system bus 38 to a random access memory (RAM) 40, a cache 42 and an interface 44 in graphics subsystem 45. The interface 44 is connected by bus 46 to graphics processor 48. The graphics processor 48 is connected by 120-bit graphics bus 50 to frame buffer 52. The frame buffer 52 are connected to a video digital to analog converter (DAC) 54 by bus 56. The DAC 54 is connected to video display 58 by line 60. In this system, the graphics subsystem 45 is an I/O device, and atomic access to it is required.

Command packet interface 44 to the graphics subsystem 45 transfers geometry and graphics context information from main memory 40 to the graphics subsystem 45. For such transfers, an application writes a list of commands to a physically contiguous locked-down memory buffer 47 in its own address space. Since the system 30 has DMA, the buffer 47 resides in the main memory system 40. The system 30 has a write-back cache 42, so it moves the contents of the buffer 47 into cache 42, generating little or no traffic on bus 38 when writing to the buffer. On systems with no DMA, this buffer will reside locally on the graphics subsystem.

When the buffer 47 is full, the CPU 32 tells the graphics subsystem 45, via a read from an I/O address on the graphics subsystem 45, that it should begin a transfer of the command packet. Status of the operation is returned as a result of the I/O read transaction.

After initiating the command packet transfer, the graphics subsystem 45 parses the packet and executes the appropriate operations, finding the details of the transaction syntax encoded in the first longword of the command packet. Execution of the commands in the packet is atomic, implying that all commands in one packet are executed before any commands in the next packet. Furthermore, the execution order is guaranteed to be the order in which the commands appear in the packet.

The following discussion describes the general framework of application software using the command packet interface 44. A discussion of the command protocol follows.

Table I below shows the outline of a procedure that issues a command to draw a line in the frame buffer 52.

TABLE I

```
Line(x1, y1, x2, y2)
int x1, y1, x2, y2;       /*screen-coordinate
                            endpoints of the line*/
{
    /*
     * Loop for each clipping rectangle.
     * numClip Rects and clipRect[] are global
       variables.
     */
    for (i=0;i<numClipRects;i++) {
        /*
         * Write vertex data into the command
           packet and
         * inform the graphics subsystem that
           it may transfer the packet.
         */
        fillLinePacket(pPacket, x1, y1, x2, y2,
        clipRect[i]);
        while (*stamp !=GOOD)
            ;
        pPacket = switchPacket();
    }
}
```

The global variable, pPacket, is the virtual addresses of a physically contiguous locked-down memory buffer serving as the graphics subsystem 45 command buffer 47. To avoid synchronization problems concerning the command packet memory, two command packet buffers 47 are used alternately. The alternation of command packets is handled by the switchPacket() routine.

The Line procedure must first fill in the command packet with header information and vertex data. It then does a read from the I/O address, stamp, and receives status over the system bus 38. Table II enumerates the status values that can be returned by the graphics subsystem 45 as a result of the I/O read.

TABLE II

| Value | Status | Description |
|---|---|---|
| 0 | GOOD | Data was accepted |
| 1 | BUSY | Subsystem 45 is unavailable; retry later |

As rectangular clipping is done in hardware, the line is clipped successively to each clipping rectangle in the window's clip list. The clip rectangle is placed in the command packet by the fillLinePacket() routine.

The Line procedure checks the status of the I/O read transaction. If the status is GOOD, then the graphics subsystem 45 immediately initiates the transfer of the command packet. A BUSY status causes a software retry, since the procedure just spins on the status word. Neither the code of Table I nor the procedural interface of Table II is appropriate for high performance graphics. They are shown to give a trivial example of the framework of the command packet interface.

The command packet interface provides atomic access for high level commands, such as drawing lines and triangles. Access to the graphics subsystem 45 is gained through the framework described above. In order to guarantee an atomic operation containing both the I/O read transaction issued by the application and the command packet transactions issued by the graphics subsystem 45, the physical address of the command packet is encoded in the address of the I/O read transaction. This encoding provides the packet address to the graphics subsystem 45 so that it can carry out the command packet transfer, while the application receives status as part of the same atomic operation.

Figure 2:
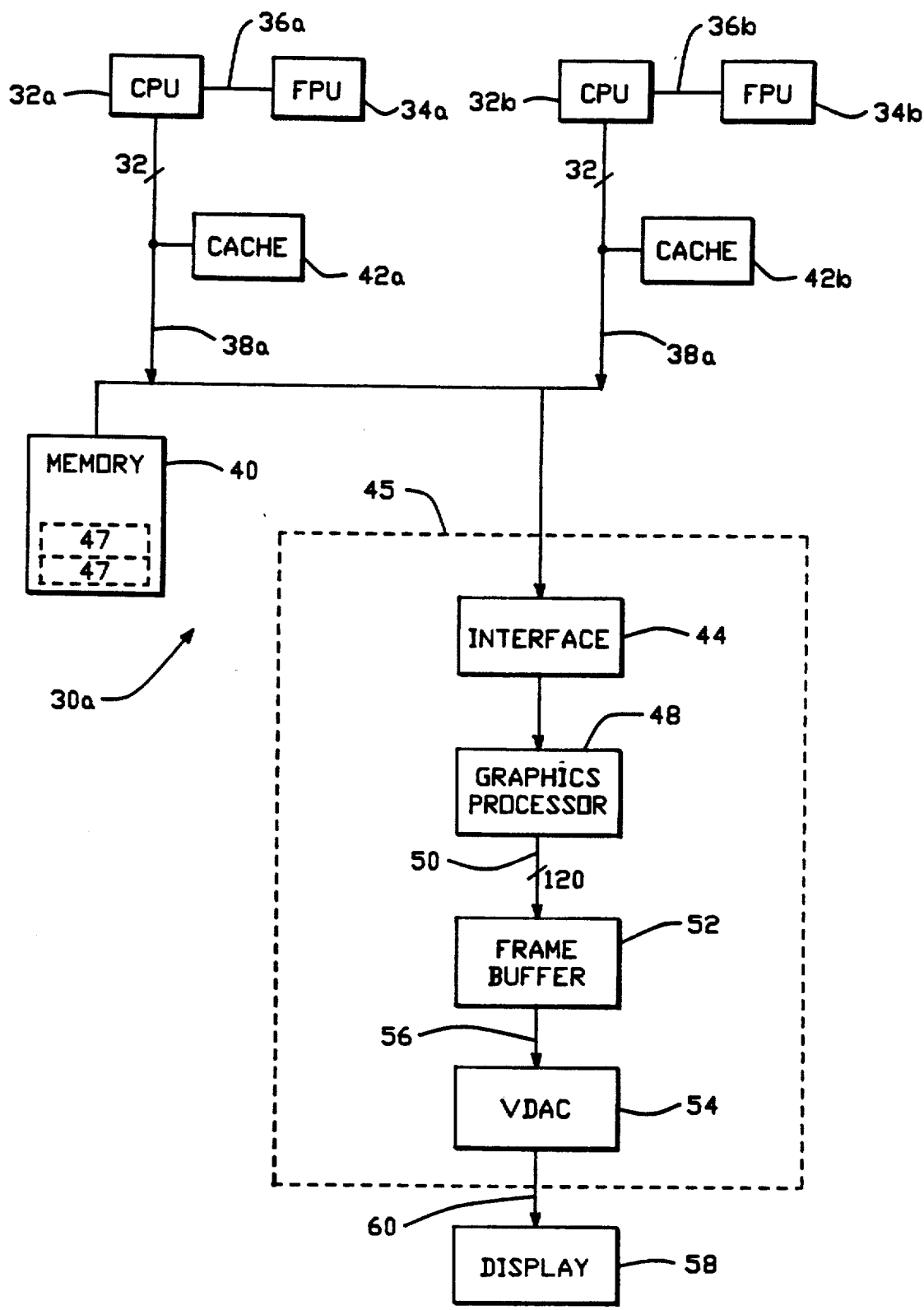
FIG. 2 is a block diagram of another embodiment of a system in accordance with the invention.

FIG. 2 shows a multiprocessor form of a system 30a, in which a first CPU 32a is connected to a FPU 34a by bus 36a. A cache 42a is connected to the CPU 32a by bus 38a. A second CPU 32b is connected to a FPU 34b by bus 36b. A cache 42b is connected to the CPU 32b by bus 38a. Other than this construction and the fact that the system 30a operates in a multiprocessor mode, the construction and operation of the FIG. 2 embodiment of the invention is the same as in the FIG. 1 embodiment.

Figure 3:
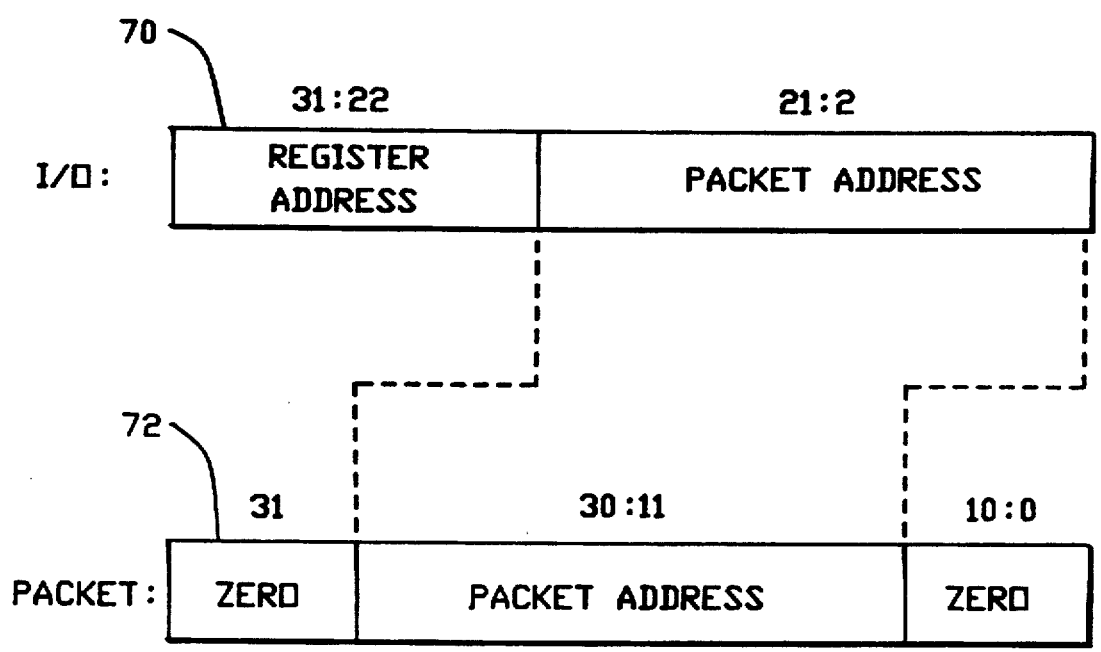
FIG. 3 is a diagram showing mapping from an address of an I/O read transaction to a base address of a command packet transfer in practice of the invention.

As shown in FIG. 3, bits 21:2 of the I/O read transaction address 70 contain bits 30:11 of the command packet address 72. In practice, the exact bit positions are dependent on the system bus employed. The positions specified are for a 32-bit system bus 38. If the available physical address space is less than 32 bits, then the high order bits are ignored. The remaining bits of the address of the I/O read transaction contain an implementation specific base address that is decoded by the graphics subsystem 45, indicating that a packet transfer should be initiated. The address of the command packet is created as follows: bits 10:0 of the command packet address 72 are zero, forcing the packet to be aligned on a 2048 byte boundary; bits 30:11 equal bits 21:2 of the I/O read transaction address 70; bit 31 of the command packet address is zero. FIG. 3 shows the mapping from the address 70 of the I/O read transaction to the base address 72 of the command packet transfer.

It should further be apparent to those skilled in the art that various changes in form and details of the invention as shown and described may be made. It is intended that such changes be included within the spirit and scope of the claims appended hereto.

What is claimed is:

1. A system for atomic access to an input/output device, said system comprising at least one host data processor, a memory connected to said at least one host data processor by a bus, a graphics subsystem comprising the input/output device connected to said bus, said memory having a locked-down buffer for storing a command package including a plurality of instructions for said graphics subsystem, said at least one host data processor including a first program for generating the command packet, said graphics subsystem including a graphics processor connected to said bus and addressable by said at least one host data processor under control of said first program to determine availability of said graphics processor, said graphics processor including a second program for initiating transfer of said command packet to said graphics subsystem as a direct memory access input/output read transaction when said graphics processor is available and for executing said plurality of instructions atomically.

2. The system for atomic access to an input/output device of claim 1 in which said memory has at least two buffers for storing the command packet, and said at least two buffers are usable by said first program in alternative succession.

3. The system for atomic access to an input/output device of claim 1 in which said first program is responsive to a busy status of said graphics processor to cause a software retry.

4. The system for atomic access to an input/output device of claim 1 in which a physical address of said command packet is encoded in an address of the input/output read transaction.

5. The system for atomic access to an input/output device of claim 1 in which said system is a multiprocessor system in which multiple processors concurrently access said graphics subsystem.

6. A system for atomic access to an input/output device, said system comprising at least one host data processor, a memory connected to said at least one host data processor by a bus, a subsystem comprising the input/output device connected to said bus, said memory having a locked-down buffer for storing a command packet including a plurality of instructions for said subsystem, said at least one host data processor including a first program for generating the command packet, said subsystem including a subsystem processor connected to said bus and addressable by said at least one host data processor under control of said first program to determine availability of said subsystem processor, said subsystem processor including a second program for initiating transfer of said command packet to said subsystem as a direct memory access input/output read transaction when said subsystem processor is available and for executing said plurality of instructions atomically.

7. The system for atomic access to an input/output device of claim 6 in which said memory has at least two buffers for storing the command packet, and said at least two buffers are usable by said first program in alternative succession.

8. The system for atomic access to an input/output device of claim 6 in which said first program is responsive to a busy status of said subsystem processor to cause a software retry.

9. The system for atomic access to an input/output device of claim 6 in which a physical address of said command packet is encoded in an address of the input/output read transaction.

10. The system for atomic access to an input/output device of claim 6 in which said system is a multiprocessor system in which multiple processors concurrently access said subsystem.

11. A method for atomic access to an input/output device, the method comprising generating a command packet including a plurality of instructions for the input/output device, storing the command packet in a memory having a physically contiguous locked-down memory buffer, addressing the input/output device to determine availability of the input/output device, initiating transfer of the command packet to the input/output device as a direct memory access input/output read transaction when the input/output device is available, executing the plurality of instructions atomically, the memory having at least two buffers for storing the command packet, and using the at least two buffers in alternative succession.

12. A method for atomic access to an input/output device, the method comprising generating a command packet including a plurality of instructions for the input/output device, storing the command packet in a memory having a physically contiguous locked-down memory buffer, addressing the input/output device to determine availability of the input/output device, initiating transfer of the command packet to the input/output device as a direct memory access input/output read transaction when the input/output device is available, and executing the plurality of instructions atomically, a busy status of the input/output device causing a software retry.

13. A method for atomic access to an input/output device, the method comprising generating a command packet including a plurality of instructions for the input/output device, storing the command packet in a memory having a physically contiguous locked-down memory buffer, addressing the input/output device to determine availability of the input/output device, initiating transfer of the command packet to the input/output device as a direct memory access input/output read transaction when the input/output device is available, executing the plurality of instructions atomically, and encoding a physical address of the command packet in an address of the input/output read transaction.

14. A method for atomic access to an input/output device, the method comprising generating a command packet including a plurality of instructions for the input/output device, storing the command packet in a memory having a physically contiguous locked-down memory buffer, addressing the input/output device to determine availability of the input/output device, initiating transfer of the command packet to the input/output device as a direct memory access input/output read transaction when the input/output device is available, executing the plurality of instructions atomically, the concurrently addressing the input/output device with multiple processors.

* * * * *